Feb. 4, 1941. R. H. SAGER 2,230,577
SUNSHADE AND OTHER AUXILIARY GLASSES
Filed June 3, 1939

INVENTOR:
ROBERT H. SAGER
BY Horace B. Fay
ATTORNEY.

Patented Feb. 4, 1941

2,230,577

UNITED STATES PATENT OFFICE 2,230,577

SUNSHADE AND OTHER AUXILIARY GLASSES

Robert H. Sager, East Cleveland, Ohio, assignor of one-half to Henry Fredrick, Cleveland, Ohio Application June 3, 1939, Serial No. 277,232

8 Claims. (Cl. 88—41)

This invention relates, as indicated, to sunshade and other auxiliary glasses, but has reference more particularly to means for attaching such glasses to spectacles.

A primary object of the invention is to provide glasses of the character described which can be removed and replaced with great facility, and which, when in position, exert no appreciable stresses on the primary spectacles.

Another object of the invention is to provide glasses of the character described, in which the means of attaching the glasses to the primary spectacles can be quickly and easily assembled, and which such means are substantially concealed from the view of an observer.

Other objects and advantages of the invention will be apparent during the course of the following description.

In the accompanying drawing, forming a part of this specification, and in which like numerals are employed to designate like parts throughout the same, Fig. 1 is a front elevational view of sunshade glasses embodying my invention, and showing the glasses mounted on a pair of primary spectacles;

Figure 1:
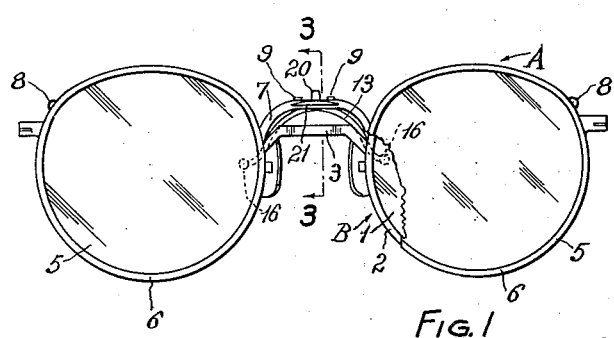
Figure 3:
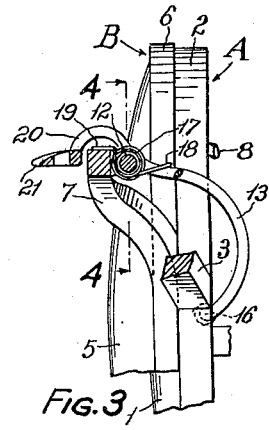
Fig. 3 is a fragmentary cross-sectional view taken on the line 3—3 of Fig. 1.
Figure 2:
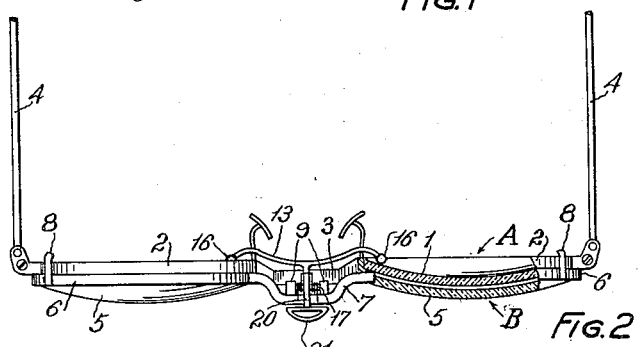
Fig. 2 is a top plan view of the glasses and spectacles shown in Fig. 1.
Figure 6:
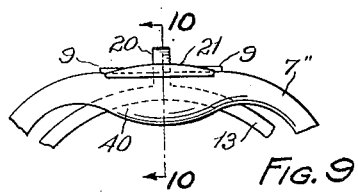
Figures 7, 8:
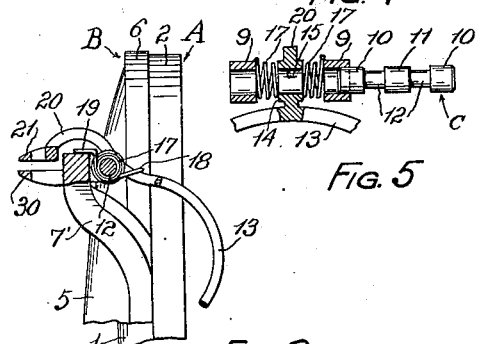
Figures 9, 10:
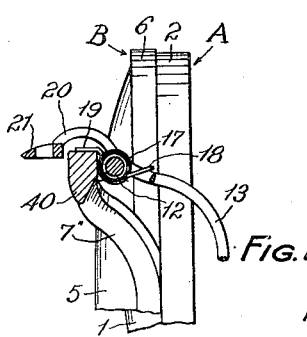

Figs. 6, 7 and 8 are views similar to Figs. 2, 1 and 3 respectively, but of a modified form of the invention; and Figs. 9 and 10 are views similar to Figs. 1 and 3 respectively, but of another modification of the invention.

Referring more particularly to Figs. 1 to 5 inclusive of the drawing, A designates the spectacles or primary pair of glasses to which a pair of anti-glare lenses or sunshade glasses B are adapted to be detachably secured.

The spectacles A comprise a pair of lenses 1, mounted on rims 2, which are connected by a nose bridge 3, and hinged to which are temples 4.

The anti-glare or sunshade glasses comprise a pair of colored or sunshaded lenses 5, mounted within lens frames 6, which are connected by means of a bridge 7. A clip 8 is secured to each of the lens frames at a point adjacent the outermost edge of the frame, these clips serving a purpose to be presently described.

Extending rearwardly from the bridge 7, and formed integrally with said bridge are lugs 9 forming bearings in which is journalled the end portion 10 of a pin C having a central portion 11 of the same diameter as the ends 10 and portions 12 of a reduced diameter intermediate the portions 10 and 11.

A clamp 13 is provided having a lug 14 centrally thereof with an aperture 15 therein into which the central portion 11 of the pin C is fitted. The clamp 13 is U-shaped in form, and has ball ends 16 thereon which are adapted to engage the rear faces of the lenses 1 to thereby clamp the sun glasses to the primary spectacles.

Figure 4:
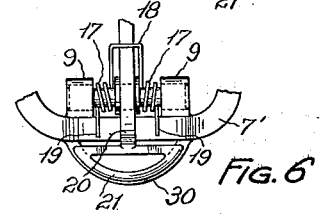
Fig. 4 is a fragmentary cross-sectional view, showing the manner in which the clamp is mounted on the sunshade glasses.
Figure 5:
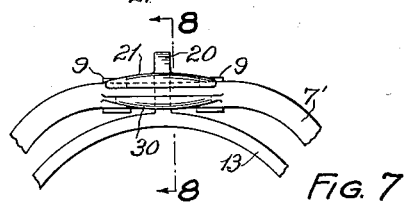
Fig. 5 is a view similar to Fig. 4, but with the parts disassembled.

For the purpose of normally biasing the clamp 13 to the position in which it clamps the sun glasses to the primary spectacles, that is, the position shown in Figs. 1, 2 and 3, a spring is provided consisting of spaced coil portions 17 connected by a U-shaped portion 18, which bears on clamp 13, and ends 19 which bear on the upper surface of the bridge 7. The coil portions 17, as best shown in Fig. 4, encircle the reduced portions 12 of the pin C and the ends thereof bear against the bearings 9 and the lug 14 of the clamp to thereby assist in preventing axial displacement of the pin. In assembling the parts, however, as shown in Fig. 5, the coil portions 17 of the spring are untensioned and of a diameter sufficient to permit insertion of the pin C. After the pin is positioned as shown in Fig. 4, the coil portions 17 of the spring are contracted, as illustrated in this figure.

For the purpose of releasing the clamp so as to permit removal of the sun glasses from the primary spectacles, the clamp 13 is provided with a forwardly extending curved portion 20 terminating in a finger-piece 21.

In removing the sun glasses from the primary spectacle, the upper portion of one of the frames 6 is engaged by the index finger of one hand and the lower portion of such frame is engaged by the thumb, and the finger-piece 21 is depressed by the central finger, thereby causing the clamp 13 to be moved in a counterclockwise direction, as viewed in Fig. 3, to a position in which the sun glasses may be lifted from the primary spectacles. In replacing the sun glasses, the finger-piece 21 is first depressed, the sun glasses placed in position over the primary spectacles, and the finger-piece released, causing the clamp to engage such spectacles.

It will be noted that the clips 8 rest upon the frames 2 and serve to balance the sun glasses on the primary spectacles. This is their sole function, and they do not in any way serve as clamping members, as in sun glasses now on the market.

It will also be noted that lugs 9 and pin C are disposed rearwardly of the upper portion of the bridge 7, and hence are concealed from the view of an observer.

It will be further noted that the sun glasses can be removed and replaced with great facility, and by the use of only one hand, as contrasted with the use of both hands in removing and replacing sun glasses of known types, and that when the sun glasses are in position they exert no appreciable stresses on the primary spectacles.

It will be understood that the invention may also be used in connection with glasses other than sun glasses, as for example in glasses which are used to supplement primary spectacles, as a substitute for bifocals.

In that form of the invention illustrated in Figs. 6, 7 and 8, the bridge 7' is provided with an extension 30, similar in form to the finger-piece 21, which forms a thumb-piece for engagement by the thumb. In removing and replacing the sun glasses, the finger-piece 21 is engaged by the index finger and the thumb-piece 30 by the thumb. This obviates the necessity of touching the frames 6, when removing and replacing the sun glasses.

In that form of the invention illustrated in Figs. 9 and 10, the central portion of the bridge 7" is extended downwardly as at 40, so as to provide a thumb-piece to be used in a manner similar to the thumb-piece 30.

It is to be understood that the forms of my invention, herewith shown and described, are to be taken as a preferred example of the same, and that various changes in the shape, size and arrangement of parts may be resorted to, without departing from the spirit of my invention, or the scope of the subjoined claims.

Having thus described my invention, I claim:

1. In a device of the character described, a pair of lenses, a bridge connecting said lenses, said bridge having spaced bearing portions, a pin journalled in said bearing portions, a clamp secured to said pin, and a spring resiliently urging said clamp into engagement with said lenses, said spring having portions restraining said pin against axial movement.

2. In a device of the character described, a pair of lenses, a bridge connecting said lenses, said bridge having spaced bearing portions, a pin journalled in said bearing portions, a clamp comprising a pair of spaced depending arms for engagement with both lenses of a pair of primary spectacles secured to said pin, and a spring having portions encircling said pin, a portion engaging said clamp, and portions engaging said bridge.

3. In a device of the character described, a pair of lenses, a bridge connecting said lenses, a clamp pivotally secured to said bridge at substantially the mid-point of the latter, means resiliently biasing said clamp into engagement with said lenses, means for releasing said clamp from engagement with said lenses, said means comprising a finger-piece extending from said clamp and a thumb-piece extending from said bridge.

4. A device as set forth in claim 3, in which said thumb-piece is disposed below and is substantially parallel with said finger-piece.

5. In a device of the character described, a pair of lenses, a bridge connecting said lenses, means pivotally secured to said bridge at substantially the mid-point of the latter and adapted to clamp said device to a pair of primary spectacles, said means comprising a unitary member having a pair of divergent arms extending therefrom, each of said arms extending to a point adjacent one of said lenses, means adapted to resiliently urge said arms into engagement with a pair of primary spectacles, and means for releasing said arms from engagement with said spectacles, said last-named means comprising a finger piece unitary with said member and extending forwardly of the latter to a point in advance of said bridge.

6. In a device of the character described, a pair of lenses, a bridge connecting said lenses, a substantially horizontally disposed lever pivoted to said bridge and extending from front to rear thereof, a finger-piece on the front end of the lever, and a clamp on the other end of the lever having having spaced clamping portions for engaging both lenses of a pair of primary spectacles, and clamping said primary spectacles between said clamps and the first-mentioned lenses.

7. In a device of the character described, a pair of lenses, a bridge connecting said lenses, a substantially horizontally disposed lever pivoted to said bridge and extending from front to rear thereof, a finger-piece on the front end of the lever, and a clamp on the other end of the lever having spaced clamping portions for engaging both lenses of a pair of primary spectacles, and clamping said primary spectacles between said clamps and the first-mentioned lenses, and means for urging the clamp into engagement with said primary spectacle lenses.

8. In a device of the character described, a pair of lenses, a bridge connecting the same, spaced primary spectacle lens engaging arms carried by said bridge, means urging said arms into engagement with the primary spectacle lenses, and single means rigidly secured to said arms and pivotally carried by said bridge and lying in front thereof for moving said arms out of engagement with said primary spectacle lenses.

ROBERT H. SAGER.